United States Patent
Park (10) Patent No.: US 9,685,837 B2
(45) Date of Patent: Jun. 20, 2017

(54) DRIVING DEVICE OF STEERING FOR A VEHICLE

(71) Applicant: HYUNDAI MOBIS CO., LTD., Seoul (KR)

(72) Inventor: Keum Hyeon Park, Suwon-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 231 days.

(21) Appl. No.: 14/750,510

(22) Filed: Jun. 25, 2015

(65) Prior Publication Data
US 2016/0134170 A1 May 12, 2016

(30) Foreign Application Priority Data
Nov. 11, 2014 (KR) ........................ 10-2014-0155768

(51) Int. Cl.
*H02K 5/22* (2006.01)
*B62D 5/04* (2006.01)
*H02K 11/20* (2016.01)
*H02K 11/33* (2016.01)

(52) U.S. Cl.
CPC ........... *H02K 5/225* (2013.01); *B62D 5/0406* (2013.01); *H02K 11/20* (2016.01); *H02K 11/33* (2016.01)

(58) Field of Classification Search
CPC ........ H02K 5/225; H02K 11/33; H02K 11/20; B62D 5/0406
See application file for complete search history.

(56) References Cited

U.S. PATENT DOCUMENTS

2012/0286630 A1* 11/2012 Tomizawa ............. H02K 11/33
310/68 D
2012/0299407 A1* 11/2012 Miyama ................. H02K 11/33
310/63
2013/0058044 A1* 3/2013 Watanabe ............. H05K 5/006
361/714

FOREIGN PATENT DOCUMENTS

| JP | 2001-63598 A | 3/2001 |
| KR | 10-2009-0017934 A | 2/2009 |
| KR | 10-2014-0065578 A | 5/2014 |
| WO | 2012/160623 A1 | 11/2012 |

OTHER PUBLICATIONS

Korean Office Action dated Aug. 4, 2015 of corresponding Korean Patent Application No. 10-2014-0155768—4 pages.

* cited by examiner

*Primary Examiner* — Mohamad Musleh
(74) *Attorney, Agent, or Firm* — Knobbe Martens Olson & Bear LLP (57) ABSTRACT

A driving device for steering a vehicle includes a housing cover formed with a power supply connector; an insert mold installed in the housing cover and formed with a connecting connector; a printed circuit board disposed on one side of the insert mold; a motor driving module disposed on one side of the printed circuit board, formed with a first power connecting portion which is connected to the connecting connector by being installed in the housing cover, having a relay circuit portion which is connected to the first power connecting portion to switch power and three inverter circuit portions which are connected to the relay circuit portion, and formed with a second power connecting portion which is connected to the respective inverter circuit portions; and a motor portion disposed on one side of the motor driving module, and having a motor connector connected to the second power connecting portion.

11 Claims, 6 Drawing Sheets

DRIVING DEVICE OF STEERING FOR A VEHICLE

CROSS-REFERENCE TO RELATED APPLICATION

The present application claims priority under 35 U.S.C. §119(a) to Korean Patent Application No. 10-2014-0155768, filed on Nov. 11, 2014, in the Korean Intellectual Property Office, which is incorporated herein by reference in its entirety.

BACKGROUND

1. Technical Field

Embodiments relate to a driving device of steering for a vehicle, and more particularly, a driving device of steering for a vehicle wherein a power loss is suppressed and components may be fastened without an additional process such as a welding or a soldering so that process steps may be simplified.

2. Related Technology

Generally, a steering device is installed in a vehicle to control a rotating angle of a wheel. A steering device steers a wheel by using a power of a driving device. A control circuit portion and a motor portion are coupled to form a driving device.

The related technology is disclosed in Korean Laid-open Patent Publication No. 2014-0065578 (published on May 30, 2014, title of invention: a combined electric steering device).

SUMMARY

Various embodiments are directed to a driving device for steering a vehicle wherein a power loss is suppressed, components may be fastened without an additional process such as a welding or a soldering so that process steps may be simplified.

In an embodiment, a driving device for steering a vehicle comprises: a housing cover in which a power supply connector is formed to be connected to a power supply portion; an insert mold installed in an inside of the housing cover, a connecting connector being exposed in a lower side of the insert mold; a printed circuit board located in one side of the insert mold; a motor driving module which is located in one side of the printed circuit board, a first power supply connecting portion to be connected to the connecting connector by being installed in an inside of the housing cover being formed, a relay circuit portion being located to be connected to the first power supply connecting portion and to switch a power supply, three inverter circuit portions being connected to the relay circuit portion, a second power supply connecting portion to be connected to the respective inverter circuit portion being exposed in a lower side of the motor driving module; and a motor portion which is located in one side of the motor driving module, a motor connector being formed to be connected to the second power supply connecting portion when the motor portion is combined to the housing cover.

In an embodiment, the connecting connector and the first power supply connecting portion are arranged perpendicular to the motor driving module.

In an embodiment, the connecting connector extends below the insert mold, the connecting connector is inserted to the first power supply connecting portion when the motor driving module is assembled to the housing cover.

In an embodiment, the first power supply connecting portion includes a pair of the first pressing pieces which are arranged in parallel so that the connecting connector may be inserted to press the connecting connector.

In an embodiment, the relay circuit portion is arranged between the connecting connector composing a battery power supply end and the inverter circuit portion transforming the phase of a current.

In an embodiment, current sensors are mounted to two of three inverter circuit portions.

In an embodiment, the current sensor is connected to a line to which a phase current is outputted from the inverter circuit portion, measures a measurement value of a current and transmits to a control circuit portion of the printed circuit board.

In an embodiment, the motor connector is protruded from the motor portion, the motor connector is inserted to the second power supply connecting portion when the motor portion is assembled to the housing cover.

In an embodiment, the second power supply connecting portion includes a pair of the second pressing pieces arranged in parallel so that the motor connector is inserted to press the motor connector.

In an embodiment, a heat sink is further included to contact the inverter circuit portion and the relay circuit portion.

In an embodiment, the heat sink is arranged between the motor driving module and the motor portion, and a sealing groove is formed in both sides of the heat sink so that an end portion of a motor portion and an end portion of a housing cover are inserted, and a sealing member is arranged in the sealing groove.

In an embodiment, in assembling a driving device, a fork fin structure is used wherein a connecting connector and a first power supply connecting portion are connected and a second power supply connecting portion and a motor connector are connected. Therefore, a fastening of components is possible without an additional process step such as a welding or a soldering, and the process may be simplified.

In an embodiment, a connecting connector is inserted to a first power supply connecting portion, and a motor connector is inserted to a second power supply connecting portion. Therefore, a connecting connector, a first power supply connecting portion, a second power supply connecting portion and a motor connector are not required to be drawn out from a housing cover to be welded.

Accordingly, a drawing hole is not required to be formed in a housing cover, and a sealing of a driving device may be improved.

In an embodiment, a connecting connector and a first power supply connecting portion are connected linearly, and a second power supply connecting portion and a motor connector are connected linearly, and therefore a power supply line may be shortened. Accordingly, a power loss in a power supply line may be minimized.

DETAILED DESCRIPTION

Hereinafter, embodiments will be described below with reference to the accompanying drawings through various examples.

While various embodiments have been described below, it will be understood to those skilled in the art that the embodiments described are by way of example only. Accordingly, the device or equipment described herein should not be limited based on the described embodiments.

Generally, a driving device for driving steering system of a vehicle includes a housing cover, a control circuit portion (PCB: Printed Circuit Board), a power supply device, a driving module and a motor portion. By combining a housing cover and a motor driving portion, a control circuit portion and a power supply end device are accommodated in the inside of a housing cover. For an electrical connection of an insert motor portion, a battery power supply terminal, a driving module terminal and a motor power supply terminal are welded.

Terminals are drawn out from a housing cover, and welded and entered into the housing cover in welding a battery power supply terminal, a driving module terminal and a motor power supply terminal. Accordingly, a power supply terminal, a driving module terminal and a motor portion terminal are located to one corner so that terminals may be drawn out to a single side of the housing cover. Therefore, a power supply line from a battery power supply end to a motor portion is prolonged, and a power loss is increased.

In addition, a drawing out groove is formed so that terminals are drawn out from a housing cover, and welded and entered into the inside of a housing cover. Therefore, it may be difficult to secure a seal between a housing cover and a motor portion. In addition, an assembling time of a driving portion is increased because a battery power supply terminal, a driving module terminal and a motor power supply terminal should be welded, a housing cover and a motor portion should be combined, and a drawing groove formed in a housing cover should be filled. Embodiments provide improvements.

Figure 1:
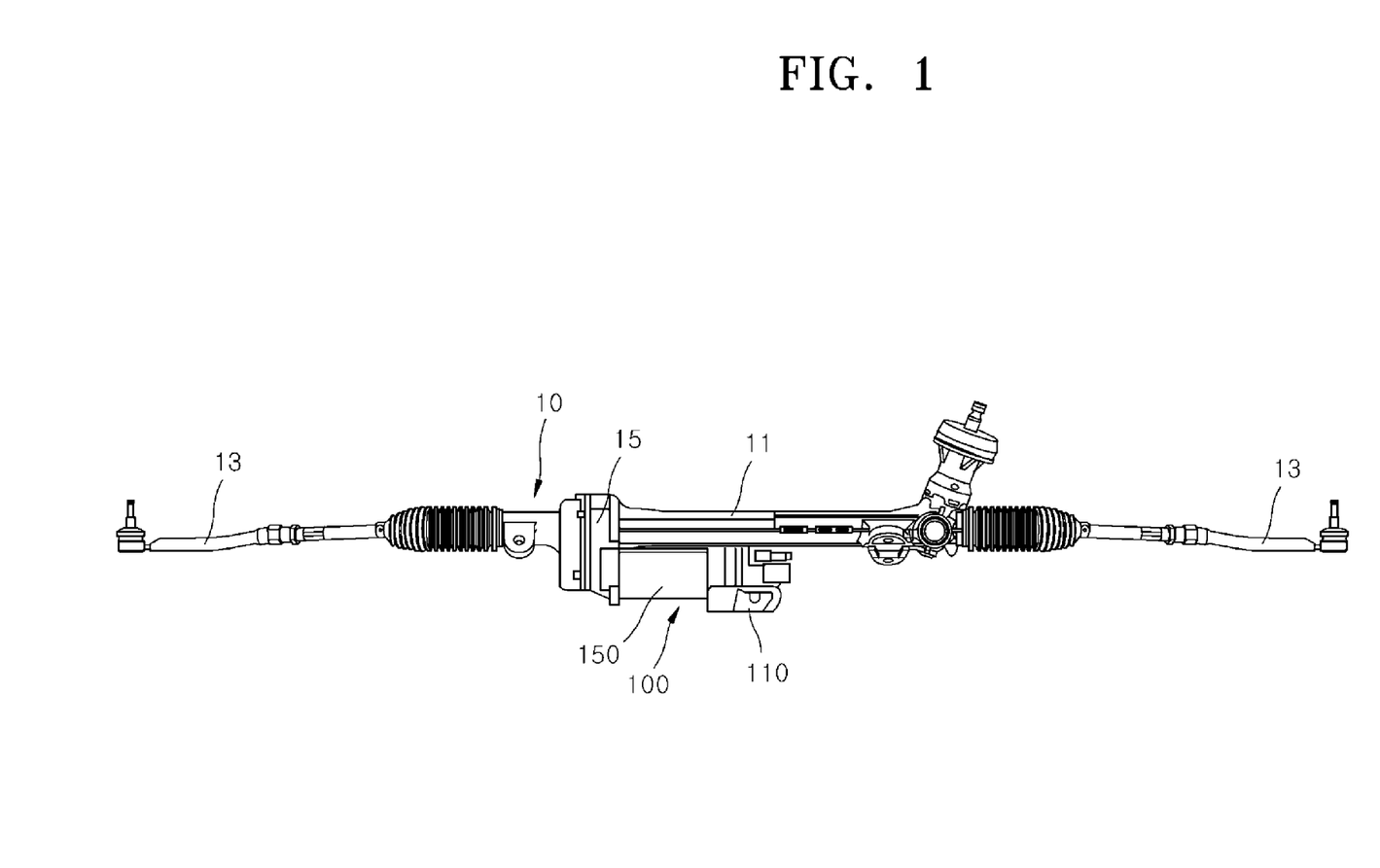
FIG. 1 is a side view of a steering device for a vehicle according to an embodiment.

FIG. 1 is a side view of a steering device for a vehicle according to an embodiment.

Referring to FIG. 1, a driving device for steering a vehicle according to an embodiment is arranged parallel to the longitudinal direction of a steering rack device 10. A steering rack device 10 include a rack housing 11 wherein a rack driving axis is accommodated, a tie rod 13 which is installed in both sides of the rack housing 11 and connected to a knuckle of a vehicle wheel, and a decelerating gear portion 15 connected to the rack driving axis. A driving device 100 is connected to the decelerating gear portion 15. A driving device 100 is driven, and accordingly a decelerating gear portion 15 is driven. A rack driving axis is moved to one side or the other side by a decelerating gear portion 15, and accordingly a steering angle of a vehicle wheel is adjusted.

Figure 2:
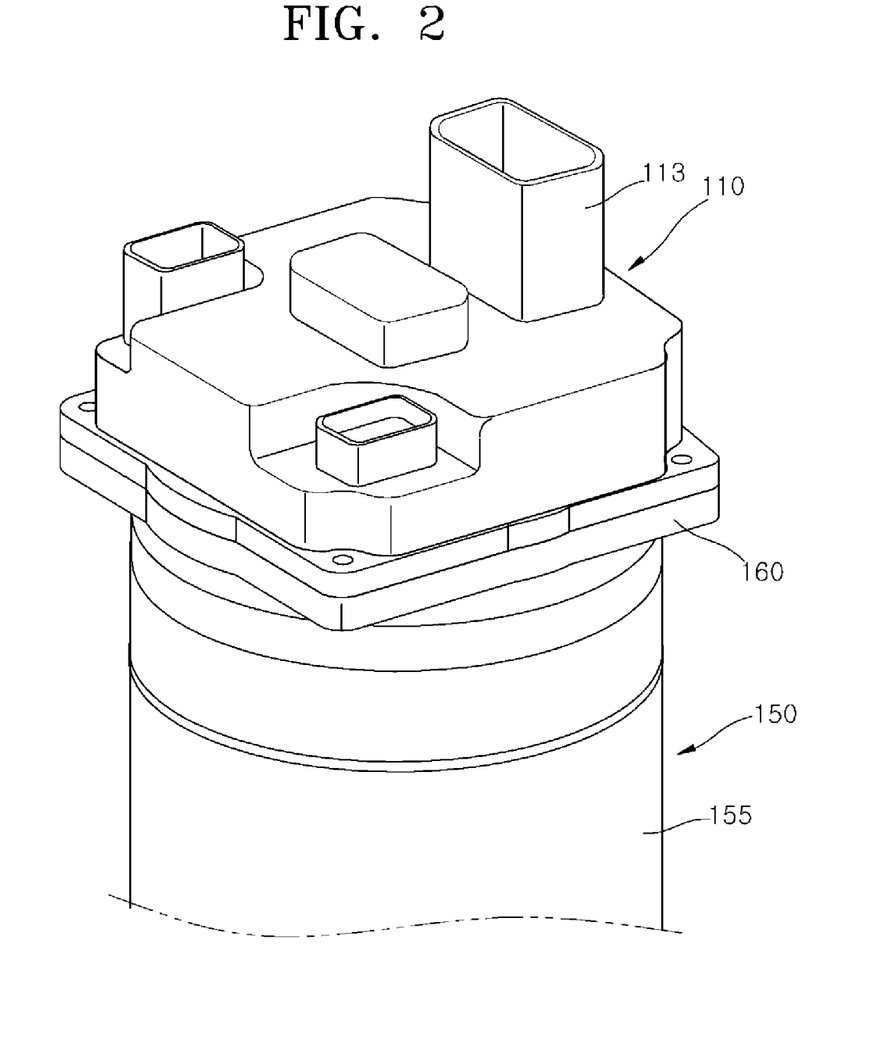
FIG. 2 is a perspective view of a driving device for steering a vehicle according to an embodiment.
Figure 3:
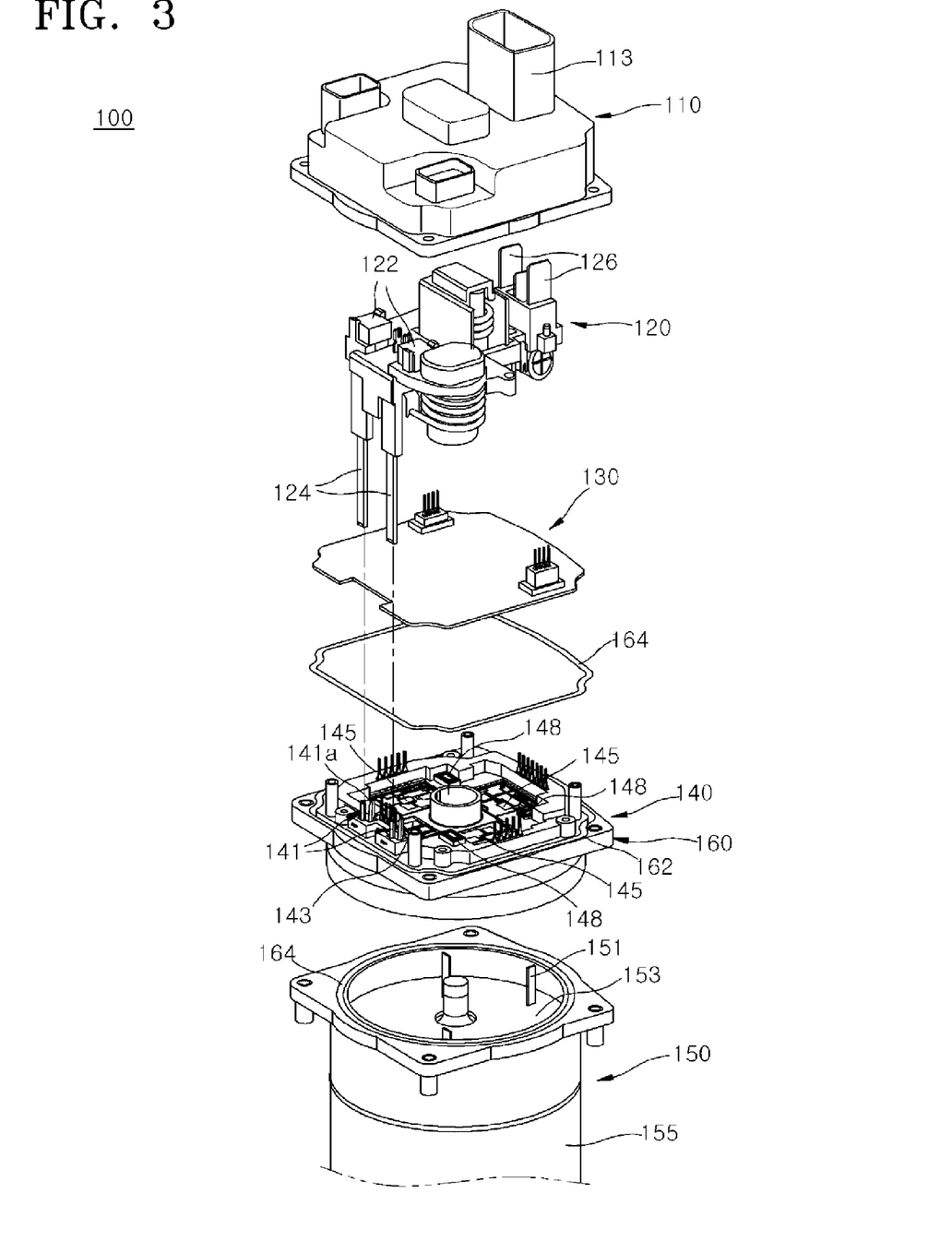
FIG. 3 is a perspective view of a disassembled driving device for steering a vehicle according to an embodiment.
Figure 4:
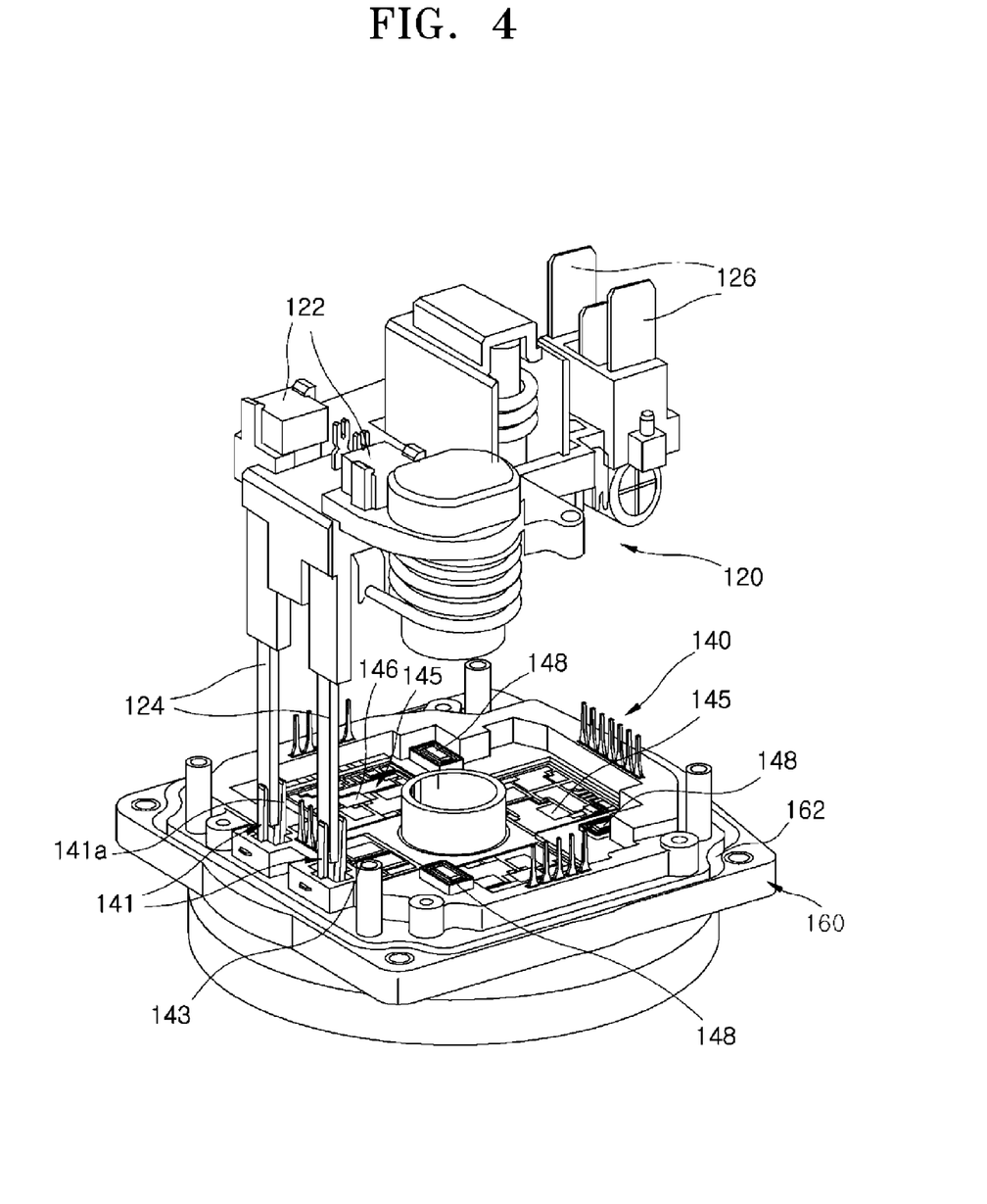
FIG. 4 is a perspective view of a connecting structure of an insert mold and a motor driving module in a driving device for steering a vehicle according to an embodiment.
Figure 5:
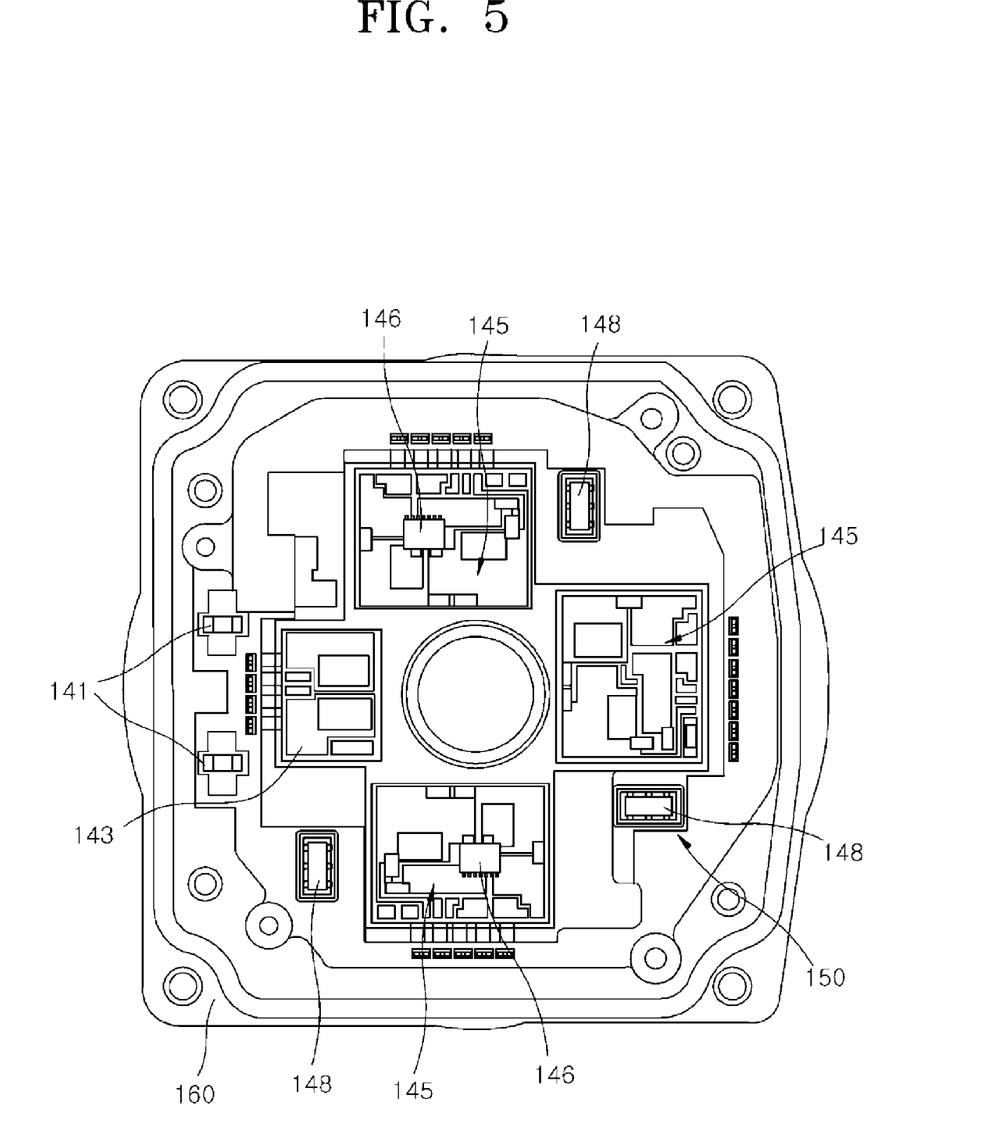
FIG. 5 is a plan view of a motor driving module in a driving device for steering a vehicle according to an embodiment.
Figure 6:
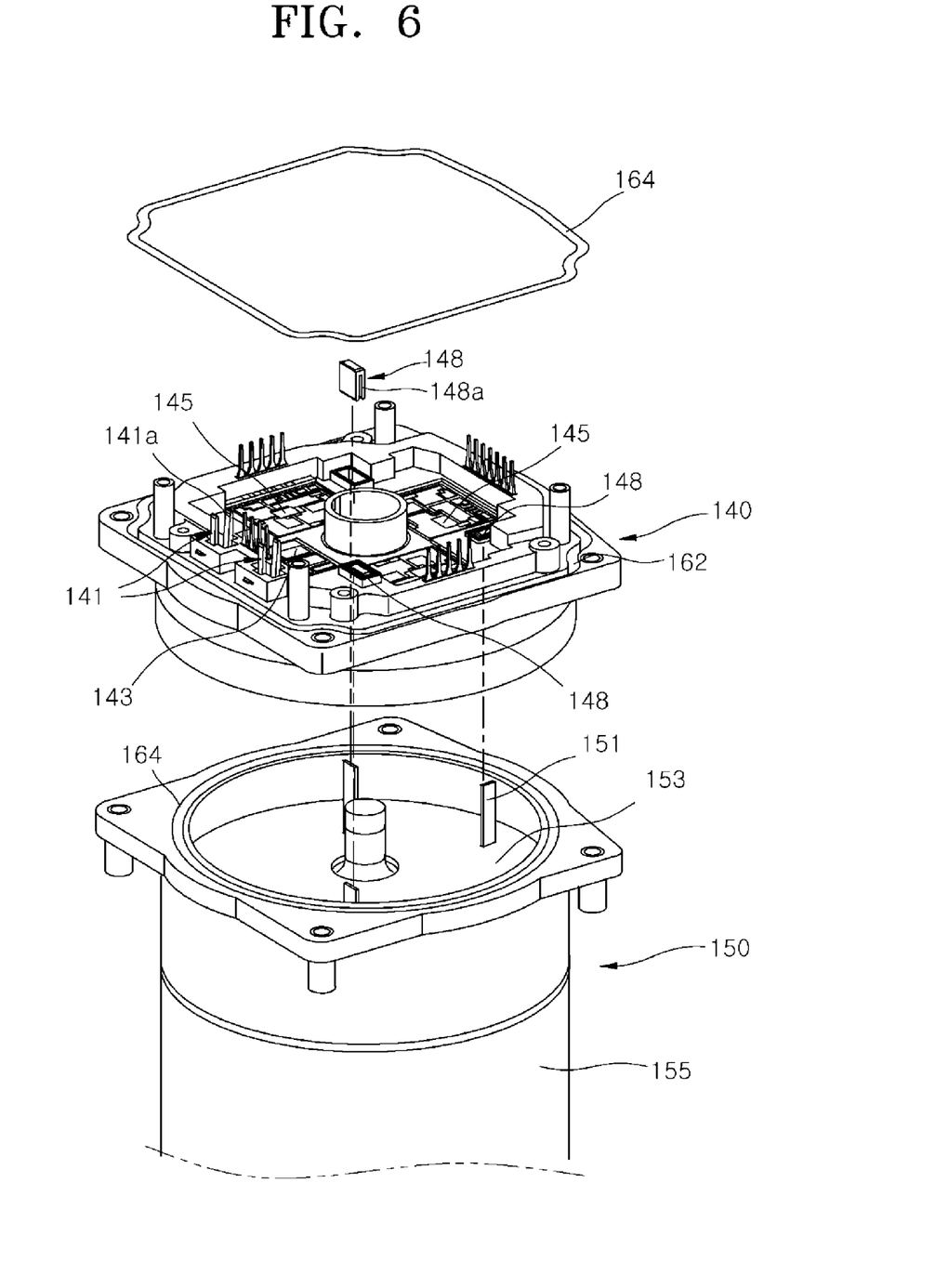
FIG. 6 is a perspective view of a disassembled structure of a connecting structure between a motor driving module and a motor portion in a driving device for steering a vehicle according to an embodiment.

FIG. 2 is a perspective view of a driving device for steering a vehicle according to an embodiment. FIG. 3 is a perspective view of a disassembled driving device for steering a vehicle according to an embodiment. FIG. 4 is a perspective view of a connecting structure of an insert mold and a motor driving module in a driving device for steering a vehicle according to an embodiment. FIG. 5 is a plan view of a motor driving module in a driving device for steering a vehicle according to an embodiment. FIG. 6 is a perspective view of a disassembled structure of a connecting structure between a motor driving module and a motor portion in a driving device for steering a vehicle according to an embodiment.

Referring to FIGS. 2 to 6, a driving deice 100 for steering a vehicle includes a housing cover 110, an insert mold 120, a printed circuit board 130, a motor driving module 140 and a motor portion 150.

In a housing cover 110, a power supply connector 113 is formed to be connected to a power supply portion. As a power supply portion, a battery is utilized. A housing cover 110 is coupled to a motor driving module 140 and finally coupled to a motor 150.

An insert mold 120 is installed in the inside of a housing cover 110. In an insert mold 120, a plurality of power supply end devices 122 are arranged. A power supply end device 122 is connected to a power supply connector 113 by a power supply connecting bus 126. A power supply from a power supply portion is applied to a power supply end device 122. A connecting connector 124 is connected to a power supply end device 122. A connecting connector 124 composes a portion of a battery power supply end to which a power supply from a battery is applied.

A connecting connector 124 is exposed in a lower side of an insert mold 120. For example, a connecting connector 124 extends perpendicular below an insert mold 120. A connecting connector 124 is a connecting bus bar formed as a shape of a thin and long plate. A cathode current is supplied to one connecting connector 124, and an anode current is applied to the other connecting connector 124.

A printed circuit board 130 is arranged in a lower side (in FIG. 3) of an insert mold 120. A control circuit portion is formed to control a motor portion 150 in a printed circuit board 130. A printed circuit board 130 controls a motor driving module 140.

A motor driving module 140 is arranged in one side of a printed circuit board 130. The first power supply connecting portion 141 is formed in a motor driving module 140. The first power supply connecting portion 141 is formed at a position corresponding to a connecting connector 124 by being assembled in the inside of a housing cover 110 so that it may be connected to a connecting connector 124 of an insert mold 120. A motor driving module 140 is assembled to a housing cover 110, and accordingly a connecting connector 124 and the first power supply connecting portion 141 are connected, and therefore a connecting connector 124 and the first power connecting portion 141 are not required to be drawn out from a housing cover 110 to be welded. Accordingly, an assembling time of a driving device 100 may be shortened. In addition, when a motor driving module 140 is assembled to the inside of a housing cover 110, the first power supply connecting portion 141 is located corresponding to a connecting connector 124, and therefore a power source line may be shortened. A power source line is shortened, and therefore a power loss in a power source line is suppressed, and a convenience for an assembly may be improved.

A connecting connector 124 and the first power supply connecting portion 141 is arranged perpendicular to a motor driving module 140. A connecting connector 124 and the first power supply connecting portion 141 are arranged perpendicular to a motor driving module 140, and therefore the length of a power source line may be minimized when a motor driving module 140 and an insert mold 120 are coupled. Therefore, a power loss in a power source line may be suppressed further.

A connecting connector 124 extends perpendicular below an insert mold 120. When a motor driving module 140 is assembled to a housing cover 110, a connecting connector 124 is inserted to the first power supply connecting portion 141. Therefore, an assembling time of a driving device 100 is shortened, and a sealing of a driving device 100 may be improved.

The first power supply connection portion 141 are arranged parallel to be formed as a shape of a fork fin including a pair of the first pressing pieces 141a pressing a connecting connector 124. The connecting connector 124 is inserted between a pair of pressing pieces and pressed, and therefore the first power supply connecting portion 141 and a connecting connector 124 may be contacted more closely. In addition, the first power supply connecting portion 141 and a connecting connector 124 are inserted each other, and the length of a power supply line may be shortened. Therefore, the power loss in a power source line may be suppressed.

In a motor driving module 140, a relay circuit portion 143 is arranged to be connected to the first power supply connecting portion 141 and to switch a power source. An electronic relay circuit portion 143 is arranged in a motor driving module 140, and therefore the generation of an operation noise in a relay circuit portion 143 is prevented, and the lifetime of a relay circuit portion 143 may be extended. A relay circuit portion 143 composes a portion of a power supply end because the first power supply connecting portion 141 and a connecting connector 124 are connected. Accordingly, a power source provided to a power supply end is blocked and therefore the operational reliability and the stability of a control circuit portion may be improved.

A relay circuit portion 143 is installed between a connecting connector 124 composing a battery power supply end and an inverter circuit portion 145 transforming a phase of a current, and therefore a battery power supply may be blocked faster when a problem is generated in the driving of a drive device 100. Accordingly, the operational reliability of a driving device 100 is improved, and the damage of a motor portion 150 may be prevented.

In a motor driving module 140, three inverter circuit portions 145 are arranged to be connected to a relay circuit portion 143. Three inverter circuit portions 145 transform the power supply which is supplied through a relay circuit portion 143 into a corresponding phase, respectively. That is, three inverter circuit portions 145 transform the power supply from a relay circuit portion 143 into the three phase current having the 120 degree phase difference.

In the two of three inverter circuit portions 145, a current sensor 146 is mounted. A current sensor 146 is connected to a line to which a phase current is outputted from an inverter circuit portion 145, measures a measurement value of a current, and transfers the value to a control circuit portion of a printed circuit board 130. A control circuit portion of a printed circuit board 130 determines an output value of a phase current by using the output value measured in the two current sensors 146. The control circuit portion operates measured two phase current by a program, and presumes an output value of a phase current from an inverter circuit portion 145 in which a current sensor 146 is not installed. If it is determined that an overcurrent is flowing in an inverter circuit portion 145, a relay circuit portion 143 is controlled to block a current. Accordingly, it is prevented that a motor portion 150 of a driving device 100 is incorrectly operated or damaged.

Three inverter circuit portions 145 and one relay circuit portion 143 are located along the circumferential direction of a rotation axis of a motor portion 150. Three inverter circuit portions 145 and one relay circuit portion 143 are located with about 90 degrees in an arrangement that the rotation axis is a center. The inverter circuit portion 145 and the relay circuit portion 143 are distributed in the entire motor driving module 140 uniformly, and the degree of freedom in designing a motor driving module 140 is improved.

The second power supply connecting portion 148 is connected to three inverter circuit portions 145. The second power supply connecting portion 148 is exposed in the lower portion in a motor driving module 140. The second power supply connecting portion 148 extends below perpendicularly in a motor driving module 140.

In an inverter circuit portion 145 and a relay circuit portion 143, a connecting pin is installed to be connected to a printed circuit board 130. A connecting pin is connected to a connecting portion of a printed circuit board 130 and soldered.

A motor portion 150 is installed in one side of a motor driving module 140. A motor portion 150 includes a motor housing 155 and a motor 153 installed in the inside of the motor housing 155. In a motor portion 150, a motor connector 151 is formed in a position corresponding to the second power supply connecting portion 148 to be connected to the second power supply connecting portion 148 when combined to a housing cover 110. A motor connector 151 and the second power supply connecting portion 148 are connected when a motor portion 150 and a housing cover 110 are assembled, and therefore a motor connector 151 and the second power supply connecting portion 148 are not required to be drawn out from a housing cover 110 to weld a motor connector 151 and the second power supply connecting portion 148. Accordingly, the assembling time of a driving device 100 may be shortened. In addition, a drawing groove in a housing cover is not required to be formed to draw out a motor connector 151 and the second power supply connecting portion 148. Therefore, a sealing of a driving device 100 may be improved.

A motor connector 151 is protruded in a motor portion 150. A motor connector 151 is inserted to the second power supply connecting portion 148 when a motor portion 150 is assembled to a housing cover 110. The motor connector 151 is inserted to the second power supply connecting portion 148 when a motor portion 150 is assembled to a housing cover 110, and therefore an assembling time of a driving device 100 is shortened, and a sealing of a driving device 100 may be improved.

In addition, the length of three of the second power supply connecting portions 140 is the same and the length of three of the motor connectors 151 is the same, and therefore the length of the three phase line by which the second power supply connecting portion 148 and the motor connector 151 are connected. Accordingly, a power loss in the three phase line may be uniform.

The second power supply connecting portion 148 is located in parallel and formed as a shape of a fork fin including a pair of the second pressing pieces 148a to press a motor connector 151. The motor connector 151 is pressed while inserted between a pair of the second pressing pieces 148a, and therefore the second power supply connecting portion 148 and the motor connector 151 may be contacted more closely. The second power supply connecting portion 148 and the motor connector are inserted each other, and the length of a power supply line may be shortened. Accordingly, a power loss in a power supply line may be suppressed. In addition, the second power supply connecting portion 148 and the motor connector 151 are not required to be drawn out from the housing cover 110 in order to weld the second power supply connecting portion 148 and the motor connector 151, and therefore a sealing of a driving device 100 may be improved.

A driving device 100 further includes a heat sink 160 to contact an inverter circuit portion 145 and a relay circuit portion 143 directly. A heat sink 160 is directly contacted to an inverter circuit portion 145 and a relay circuit portion 143, and therefore the heat energy from the inverter circuit portion 145 and the relay circuit portion 143 is transferred by the heat sink 160. Accordingly, the inverter circuit portion 145 and the relay circuit portion 143 may be prevented to be damaged or incorrectly operated.

A heat sink 160 is located between a motor driving module 140 and a motor portion 150. A sealing groove 162 is formed in both sides of the heat sink 160 so that the end portion of the motor portion 150 and the end portion of the housing cover 110 are inserted. The sealing grove 162 includes a sealing member 164 and seals the inside of the driving device 100. Accordingly, it may be prevented that water is introduced between a motor portion 150 and a heat sink 160 and a housing cover 110.

As described above, when a housing cover 110, an insert mold 120, a printed circuit board 130, a motor driving module 140 and a motor portions are assembled, a connecting connector 124 and a first power supply connecting portion 141 are connected, and a second power supply connecting portion 148 and a motor connector 151 are connected. Accordingly, an assembling time of a driving device 100 may be shortened.

In addition, a connecting connector 124 is inserted to the first power supply connecting portion 141, and a motor connector 151 is inserted to the second power supply connecting portion 141, and therefore it is not required that the connecting connector 124, the first power supply connecting portion 141, the second power supply connecting portion 141, and the motor connector 151 are not required to be welded after being drawn out from a housing cover 110. Accordingly, a drawing groove is not needed in a housing cover 110, and therefore a sealing of a driving device 100 may be improved.

In addition, a connecting connector 124 and the first power supply connecting portion 141 are connected linearly, and the second power supply connecting portion 148 and a motor connector 151 are connected linearly, and therefore a power supply line may be shortened. Accordingly, a power loss in a power supply line may be suppressed.

In addition, an electronical relay circuit portion 143 is utilized to a motor driving module 140, and therefore an operational noise in a relay circuit portion 143 is prevented and the lifetime of a driving device 100 may be extended.

In addition, the length of two power supply lines composed by a connecting connector 124 and the first power supply connecting portions 141 is the same and the length of three power supply lines composed by the second power supply connecting portion 148 and a motor connector 151 is the same, and therefore a power loss in the power supply line may be uniform.

While various embodiments have been described above, it will be understood to those skilled in the art that the embodiments described are by way of example only. Accordingly, the device described herein should not be limited based on the described embodiments.

What is claimed is:

1. A driving device for steering a vehicle comprising:
   a housing cover in which a power supply connector is formed to be connected to a power supply portion;
   an insert mold which is installed in an inside of the housing cover, a connecting connector being exposed in a lower portion of the insert mold;
   a printed circuit board which is located in one side of the insert mold;
   a motor driving module which is located in one side of the printed circuit board, a first power supply connecting portion being formed to be connected to the connecting connector by being installed in an inside of the housing cover, a relay circuit portion being located to be connected to the first power supply connecting portion and to switch a power supply, three inverter circuit portions being connected to the relay circuit portion, a second power supply connecting portion being exposed in a lower side of the motor driving module to be connected to each of the inverter circuit portion; and
   a motor portion which is located in one side of the motor driving module, a motor connector being formed to be connected to the second power supply connecting portion when the motor portion is combined to the housing cover.

2. The device of claim 1, wherein the connecting connector and the first power supply connecting portion are located perpendicular to the motor driving module.

3. The device of claim 1, wherein the connecting connector extends to a lower portion of the insert mold, the connecting connector being inserted to the first power supply connecting portion when the motor driving module is assembled to the housing cover.

4. The device of claim 3, wherein the first power supply connecting portion includes a pair of first pressing pieces which are located in parallel so that the connecting connector may be inserted, the pair of the first pressing pieces pressing the connecting connector.

5. The device of claim 1, wherein the relay circuit portion is installed between the connecting connector composing a battery power supply end and the inverter circuit portion transforming a phase of a current.

6. The device of claim 1, wherein a current sensor is mounted in two among three of the inverter circuit portions.

7. The device of claim 6, wherein the current sensor is connected to a line outputting a phase current from the inverter circuit portion and measures a measurement value of a current and transfer to a control circuit portion of the printed circuit board.

8. The device of claim 1, wherein the motor connector is protruded from the motor portion, the motor connector being inserted to the second power supply connecting portion when the motor portion is assembled to the housing cover.

9. The device of claim 8, wherein the second power supply connecting portion includes a pair of second pressing pieces which are located in parallel so that the motor connector may be inserted, the pair of the second pressing pieces pressing the motor connector.

10. The device of claim 1, further comprising a heat sink contacted by the inverter circuit portion and the relay circuit portion.

11. The device of claim 10, wherein the heat sink is located between the motor driving module and the motor portion, a sealing groove being formed on both sides of the heat sink so that an end portion of the motor portion and an end portion of the housing cover may be inserted, a sealing member being installed in the sealing groove.

* * * * *